R. B. HUGUNIN.
Improvement in Rollers and Fastenings for Clothes Wringers.
No. 4,680. Reissued Dec. 26, 1871.
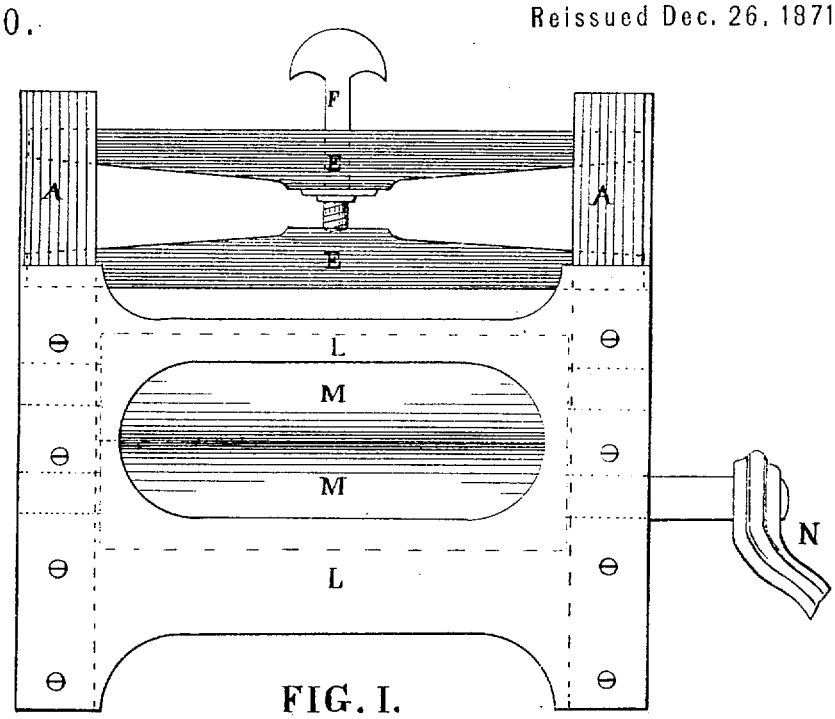
FIG. I.
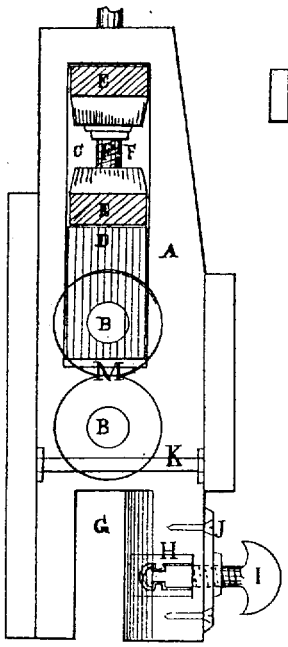
FIG. II.
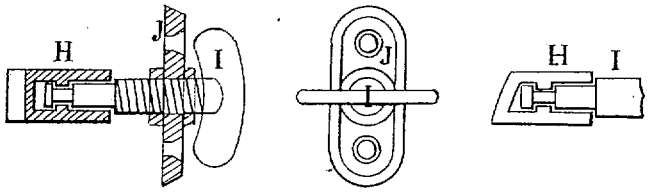
FIG. III.
WITNESSES:
H. W. Spencer
H. H. Porter.
INVENTOR:
R. B. Huguninn,
by A. H. Spencer
AM. PHOTO-LITHOGRAPHIC CO. N.Y. (OSBORNE'S PROCESS.)

(91.) 2 Sheets--Sheet 2.
R. B. HUGUNIN.
Improvement in Rollers and Fastenings for Clothes Wringers.
No. 4,680. Reissued Dec. 26, 1871.
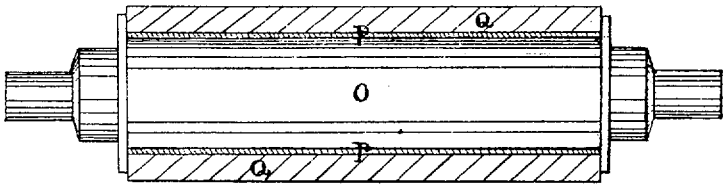
FIG. IV.
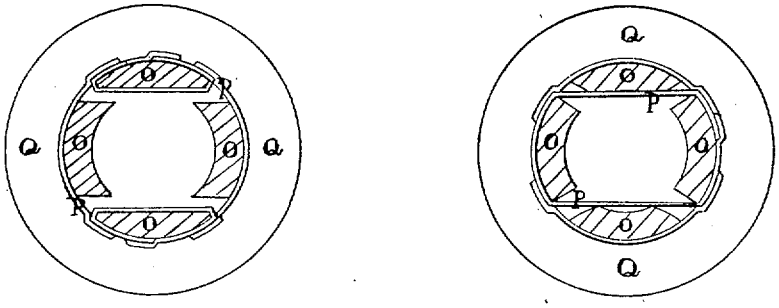
FIG. V.
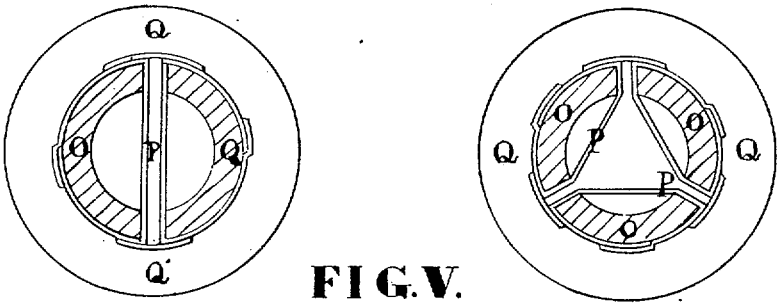
FIG. V.
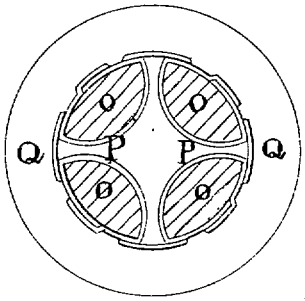
WITNESSES.
H. H. Spencer
H. H. Porter.
INVENTOR:
R. B. Huguninn.
by A. H. Spencer
AM. PHOTO-LITHOGRAPHIC CO. N.Y. (OSBORNE'S PROCESS.)

UNITED STATES PATENT OFFICE.

ROBERT B. HUGUNIN, OF CLEVELAND, OHIO, ASSIGNOR TO ALBERT H. SPENCER, OF PROVIDENCE, RHODE ISLAND.

IMPROVEMENT IN ROLLERS AND FASTENINGS FOR CLOTHES-WRINGERS.

Specification forming part of Letters Patent No. 53,001, dated March 6, 1866; reissue No. 4,680, dated December 26, 1871.

*To all whom it may concern:*

Be it known that ROBERT B. HUGUNIN, of the city of Cleveland, county of Cuyahoga and State of Ohio, has invented a new and efficient method of permanently securing and supporting to the shaft the elastic coverings of rollers (used for clothes-wringers, wine-expressers, &c., &c.,) so as to prevent them from becoming loose and turning, thereby rendering them valuable and useful until the coverings are actually worn out; and has also invented an improved and simple frame to be used in connection with the elastic-covered rollers; and it is hereby declared that the following is a full, clear, and exact description of the same, reference being had to the accompanying drawing forming a part of this specification, in which—

Figure 1 is a front view of the frame and rollers as used in wringing. Fig. 2 is a view of the ends of the rollers, journal-blocks, wooden springs, and movable clamp for fastening the frame to the tub. Fig. 3, enlarged view of the clamping instrument for fastening the frame to the tub. Fig. 4, Sheet II, is a plan view of a shaft. Fig. 5, cross-sectional views of the shafts, showing them with two, three, and four openings for securing the cloth to the shaft; also, illustrating the way the cloth is passed through the shafts, and the manner of securing the same.

Similar letters of reference indicate corresponding parts in all the figures.

To enable those skilled in the art to fully understand said invention, I will proceed to describe its construction and operation.

In the drawing, A A are the two end pieces of the frame; B B, holes in the end pieces A A and in the journal-blocks D D, forming bearings for the shafts of the rollers; C C, vertical slots cut in the end pieces A A for the journal-blocks D D and the ends of the springs E E to move in; D D, journal-blocks or bearings for the upper roller to turn in; E E, two springs of wood or other suitable material, the lower one resting its ends on the tops of the journal-blocks D D, and the upper one pressing its ends against the wood or other material at the upper ends of the slots C C; F, an adjusting-screw passing down through the middle of the upper spring (if but one screw is used) and through a screw-plate secured to said spring, and resting its point on the center of the lower spring or on a small metal plate or socket fitted to receive it. This screw is used for tightening or slackening the springs, and thus regulating the pressure upon the rollers; G G, beveled slots cut upward from the lower ends of the end pieces A A to receive the edge of the tub or box on which it is desired to use the wringer; H H, movable clamp-pieces made open, (to receive the screws,) and having a beveled or rounded clamping surface. On their inner sides are projections so made and arranged as to hold the points of the propelling-screws, so as to allow the same to move freely within them, and at the same time follow the forward-and-back motion of the screws. These pieces work best in square openings; I I, thumb-screws for propelling the clamp-pieces H H; J J, metal plates through which the screws I I move. The clamp pieces H H and thumb-screws I I, in combination with the screw-plates J J, make a most efficient and simple fastening for the frame to the tub, the rounded or beveled point to the clamp allowing it to accommodate itself to the surface of a large or small tub or box, as may be required, while the play on the point of the screw, to which it is secured, prevents its binding or bending the screw; K K, common bolts and washers, riveted down, passing through the end pieces A A, from side to side, above the slots G G, to protect the end pieces from splitting where they pass over the tub; L L, side pieces of the frame connecting the two end pieces. These also act as guides to the clothes by preventing them from getting beyond the ends of the rollers; M M, rollers; N, crank; O O, Fig. 5, cross-sections of hollow metal shafts, with two, three, or four openings for securing the cloth to the shafts; P P, cloth passed through these openings and the ends fastened; Q Q, elastic coverings, vulcanized upon or over and around the shafts, and to the cloth after its being passed through the shafts and secured.

The shafts O O are made of iron or any other suitable metal that will stand the high heat necessary in vulcanizing, cast hollow, of a proper thickness, with as many openings cast in them (and of such shape) as may be necessary for securing the cover with the strength required, in proportion to the work the roll has to do. When the shafts are cast and their journals properly turned they are japanned and baked or galvanized, and then passed into the rubber factory to be covered or finished.

In covering, one or more ply of strong cloth or wire-cloth, or both combined, after being thoroughly coated with new gum, (or rubber) is cut to the proper shape, and passed edgewise clear through the openings, (if but two openings are used.) The sides are then drawn tightly together, lapped over, and pressed down, the gum on the cloth firmly uniting the pieces of cloth when pressed together. Thus one side of the shaft between the two openings is covered. To cover the other side a similar piece of cloth is passed through the same opening as before, the sides brought around and pressed down over the uncovered side. Still greater strength may be given to this shaft-secured foundation for the elastic covering by winding the cloth-prepared shaft, above described, with an additional layer of cloth over its entire surface; or single strips may be cut, of sufficient length and width to cover the seams when they may be pressed or gummed down, the adhesive qualities of the rubber coating thus tying the cloth together on both sides, where it penetrates through the shaft. This process, in connection with vulcanizing, makes the cloth covering as perfect and strong as if woven through and around the shaft, as described.

When rollers for constant use are required, such as are used in laundries, &c., they should be made with as many openings for securing the coverings as the diameter of the shaft will admit of without sacrificing its due strength. In covering them with the prepared cloth, with three or more openings in the shafts, pass the proper-sized pieces edgewise through, and lap them round so as to cover the parts of the shaft between each two openings in detail, after which the seams may be covered, and the pieces of cloth united where they penetrate the shaft, by proper strips, as before described; or, instead, an entire piece of cloth may be wrapped around over all for that purpose.

Wire-cloth might be used to good advantage next to the shaft to take the wear on the edges near the openings, if there should be any wear there more than elsewhere.

The operation of giving the shaft the final covering may be briefly described, as follows: After the shaft has been covered with the prepared cloth, as described, having a rubber surface, the desired thickness of raw rubber compound is wrapped over all, (the cloth and shaft.) The whole is then placed in a suitable mold and vulcanized. This process secures the rubber to the cloth, firmly uniting the edges of the same where lapped over, making the cloth to all intents and purposes a part and parcel of the rubber, and the roller in itself complete.

The fastenings of the cloth to the shaft, as herein described, differ from the fastening and covering patented by said R. B. HUGUNIN on the 31st day of October, 1865, in this respect: The fastening then patented consisted of but one piece of prepared cloth passed through the shaft, the cloth being of sufficient size to lap around and cover the entire shaft, each end covering one-half of the shaft. This covering would answer very well for turning the roller one way; but in reversing or turning backward the covering might slip, and by this means become loose and chafe the cloth off where it penetrated the shaft, and sooner or later allow the shaft to turn without the covering, and thus render it worthless. The present coverings are made to allow the roll to turn either way, and should the cloth, by accident or otherwise, give way in any one or two places where it penetrates, the other cloth would hold the covering still secure. In operation these rollers are put into said improved frame, the same as other rollers in other frames, and worked in the same manner as other wringers.

Having thus fully described said improvements, what I claim as the invention of the said ROBERT B. HUGUNIN, and desire to secure by Letters Patent, is—

1. Shaft-fastened elastic rollers, when made in combination with hollow or slotted metal shafts, with two or more openings in the same, having two or more pieces of cloth or wire-cloth, or both combined, prepared with raw-rubber compound, passed through the openings of the shafts, and the sides of the pieces of cloth or wire-cloth lapped around, and elastic vulcanizable gum vulcanized thereon, substantially as and for the purposes specified.

2. The combination of the clamps H H, thumb-screws I I, and screw-plates J J, substantially as described, and for the purposes specified.

3. A clamping device, consisting of a stationary plate, a propelling-screw, and a bearing-surface having a prolonged shank or body which embraces part of the propelling-screw, and is so arranged as to be withdrawn into a recess of such form as to prevent the rotation of the clamp with the screw, substantially as and for the purpose herein specified.

4. The combination of the springs E E and adjusting-screw F, when the springs are both free to rise and fall in the slots of the uprights, and the thumb-screw operates between them to increase or diminish their distance from each other, substantially as set forth.

5. The combination, in a wringing-machine, of two elastic rollers set in suitable uprights and bearings, with the two springs, E E, arranged so as to be separated more widely by any increase of their tension imparted by the adjusting-screw F, or its equivalent, substantially as and for the purpose specified.

ALBERT H. SPENCER.

Witnesses:
H. W. SPENCER,
H. K. PORTER.

(91)